(12) United States Patent
Zemke et al.

(10) Patent No.: US 7,548,041 B2
(45) Date of Patent: Jun. 16, 2009

(54) POWER MANAGEMENT CIRCUIT AND METHODOLOGY FOR BATTERY-POWERED SYSTEMS

(75) Inventors: Roger A. Zemke, Londonderry, NH (US); David B. Bell, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 440 days.

(21) Appl. No.: 11/024,473

(22) Filed: Dec. 30, 2004

(65) Prior Publication Data

US 2006/0145665 A1 Jul. 6, 2006

(51) Int. Cl.
*H02J 7/00* (2006.01)
(52) U.S. Cl. .................................. 320/133; 320/128
(58) Field of Classification Search .............. 320/155, 320/137, 145, 162, 139, 163, 133, 157, 159
See application file for complete search history.

(56) References Cited

U.S. PATENT DOCUMENTS

| | | | | |
|---|---|---|---|---|
| 4,668,901 A | * | 5/1987 | Furukawa | 320/149 |
| 4,755,733 A | * | 7/1988 | Laliberte | 320/125 |
| 4,755,735 A | * | 7/1988 | Inakagata | 320/150 |
| 4,779,035 A | * | 10/1988 | Engelmann | 320/139 |
| 5,363,312 A | * | 11/1994 | Ninomiya | 702/63 |
| 5,576,608 A | * | 11/1996 | Nagai et al. | 320/159 |
| 5,606,240 A | * | 2/1997 | Kokuga et al. | 320/129 |
| 5,818,202 A | * | 10/1998 | Miyamoto et al. | 320/125 |
| 6,300,744 B1 | * | 10/2001 | Shum | 320/137 |
| 6,459,239 B1 | * | 10/2002 | Price | 320/130 |
| 6,617,826 B2 | * | 9/2003 | Liao et al. | 320/118 |
| 7,221,977 B1 | * | 5/2007 | Weaver et al. | 607/29 |
| 2002/0130638 A1 | * | 9/2002 | Sherman | 320/134 |

OTHER PUBLICATIONS

Garmin International, Inc. Non-Disclosure Agreement, Sep. 29, 2004.
Research in Motion Limited (RIM) Non-Disclosure Agreement, Jun. 1, 2002.
Apple Non-Disclosure Agreement, May 10, 2005.

* cited by examiner

*Primary Examiner*—Akm E Ullah
*Assistant Examiner*—Nguyen Tran
(74) *Attorney, Agent, or Firm*—McDermott Will & Emery LLP

(57) ABSTRACT

A power management system including a battery-powered application, in which an input current is supplied by a source of current that may be a current-constrained source, such as a USB port, to a battery for charging the battery and to an application load. Battery charging current is supplied to the battery for a period of time based on magnitude of battery charging current, so that charging current of lesser magnitude is applied to the battery for a greater period of time. In accord with one implementation, battery charging current is determined by monitoring the difference between a programmed charging current, dependent on battery type, and magnitude of current used by the load. Change of battery charging current due to voltage mode charging, when charge current begins to drop as the battery approaches full charge, is detected, and in response, the charging period is set to a fixed charging period based on the battery.

12 Claims, 2 Drawing Sheets

POWER MANAGEMENT CIRCUIT AND METHODOLOGY FOR BATTERY-POWERED SYSTEMS

TECHNICAL FIELD

This disclosure is related generally to power management in battery-powered systems in which input current is supplied both to power a load and charge the battery, and more particularly to doing so in such systems in which input current is constrained, such as from a USB port.

BACKGROUND

In battery-powered systems, such as laptop computers, PDAs, MP3 players, etc., a source of input current supplies current to power the application and, at the same time, charge the battery. Power management systems receiving an unlimited source of input current, such as would be obtained from a wall socket ("wall wart"), generally implement charge timers programmed to be at a prescribed, fixed amount of time, set by the designer as a function of the charge current and battery capacity. This design has been appropriate in unlimited current source systems because charge current magnitude is maintained constant throughout the charge cycle until the charger enters voltage mode charging when the battery is nearly fully charged.

However, in chargers that receive power from a current constrained source, such as a USB port powering an application load at the same time, the magnitude of current available to charge the battery may not be as programmed. In this case, the battery charge current will be less than the programmed magnitude so that the load receives sufficient current for powering the load without exceeding the current capacity of the USB port. When the battery is not receiving its full charge current, the fixed period timer will tend to time out before the battery is fully charged.

It would be desirable to implement variable timing so as to increase the period of battery charging when there is a decrease of charging current, in order to ensure that the battery will achieve full charge. However, fixed period charging should be maintained when the battery is in its constant voltage mode of charging.

SUMMARY

In a power management system including a battery-powered application, in which an input voltage is supplied as a source of current (that may be a current-constrained source, such as a USB port), to a battery for charging the battery and also to a load for powering an application, the magnitude of current available for charging the battery varies depending on the amount of current required by the load. In accord with one aspect of this disclosure, battery charging current is supplied to the battery for a period of time based on magnitude of battery charging current. For example, charging current of lesser magnitude is applied to the battery for a greater period of time to ensure full charge.

Magnitude of battery charging current may be determined by monitoring the difference between a programmed battery charging current, dependent on battery type and characteristics, and the magnitude of current used by the load.

In accord with another aspect of the disclosure, any change of battery charging current due to voltage mode charging, when charge current begins to drop as the battery approaches full charge, is detected, and in response, the charging period is set to a prescribed charging period dependent on battery type.

In one embodiment of the disclosure, the system comprises an input current source for supplying an input current to a battery and a load, a load current monitor circuit for determining load current magnitude and a variable period timer. A charging circuit coupled to the timer controls supply of current to the battery for a charging period determined by the timer, and a control circuit responsive to load current magnitude controls the timer period.

The charging circuit may be coupled to the load current monitor circuit and configured to control magnitude of battery current in accordance with the difference between (a) a charging current of programmed magnitude dependent on battery type and characteristic, and (b) load current.

The system may include a charge mode detector circuit, coupled to the battery and to a source of reference voltage, for detecting voltage mode charging of the battery. In response, the detector sets the charging period of the timer to a prescribed fixed charging period.

Additional aspects and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

DETAILED DESCRIPTION

Figure 1:
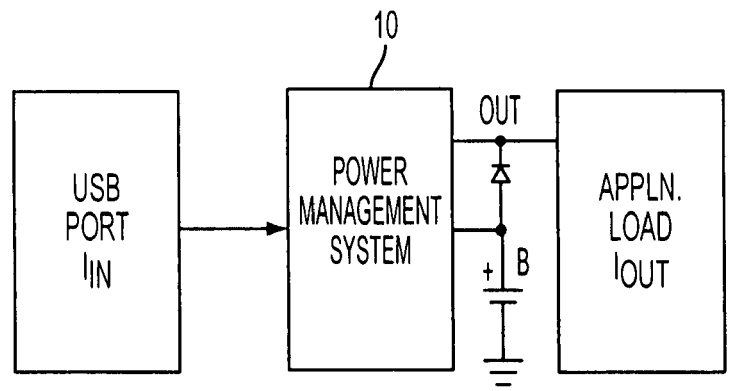
FIG. 1 is a block diagram showing the environment in which the system disclosed herein operates.

Referring to FIG. 1, a power management system 10 is depicted in which a USB port (Iin) and a battery B cooperatively power an application load (Iout). The USB port provides current to the load and also to the battery when the battery is at least partially discharged. Power management system 10 shares USB current between the battery and load strategically such that the maximum current capacity of the port is not exceeded. The USB port is a current constrained source having a maximum current delivery capability that is specified by the relevant Universal Serial bus standard or standards, e.g., Universal Serial Bus Revision 2.0 Specification. In accordance with this disclosure, power management system 10 also controls the period of time during which the battery is charged. That is, when load current increases and the amount of battery charging current is reduced to limit USB current to its specified maximum current, the battery is charged for a longer period to ensure that the battery attains full charge, rather than in constant current mode of charging.

Figure 2:
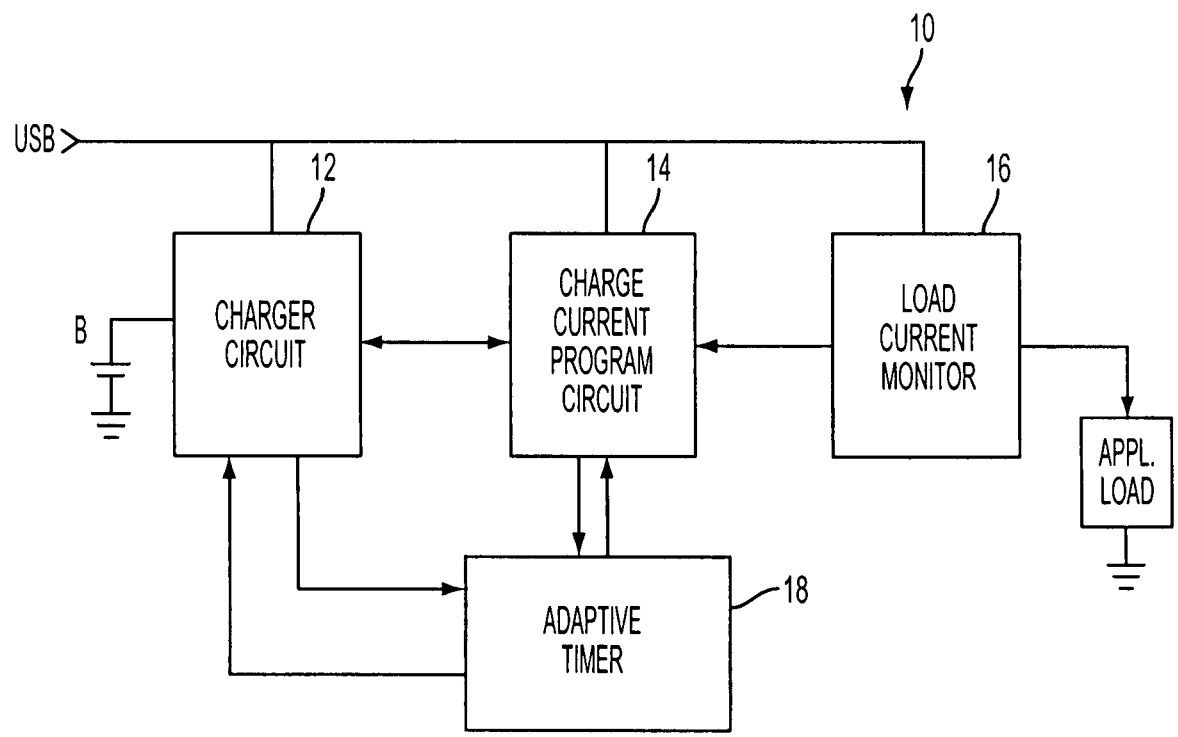
FIG. 2 is a generalized block diagram showing a power management system, in accord with the disclosure.

In FIG. 2, power management circuit 10 can be seen to comprise four functional blocks: battery charger circuit 12, charge current programming circuit 14, load current monitor 16 and an adaptive timer circuit 18. Battery charger circuit 12 is a constant current, constant voltage lithium-ion battery charger that charges battery B initially with a programmed constant current ICHG of a magnitude controlled by battery charge current programming circuit 14 in accordance with the rating of the battery. When the battery becomes fully charged or nearly fully charged, the charger 12 operates in a constant voltage mode of reduced current, to maintain the battery fully charged.

The period of time during which the charger circuit 12 in the constant current mode is applying current to the battery is controlled by adaptive timer 18. As described previously, in unlimited current supply systems, timer 18 conventionally has been set to a fixed period of time, usually by running a counter at a predetermined fixed rate, dependent upon battery characteristics. However, in accord with this disclosure, because the supply of current is constrained, the timer period is varied during constant current mode charging, to account for reduced current that is supplied to the battery upon demand for current by the load, so that charging time is commensurately increased. This system will now be described in more detail with reference to FIG. 3.

Figure 3:
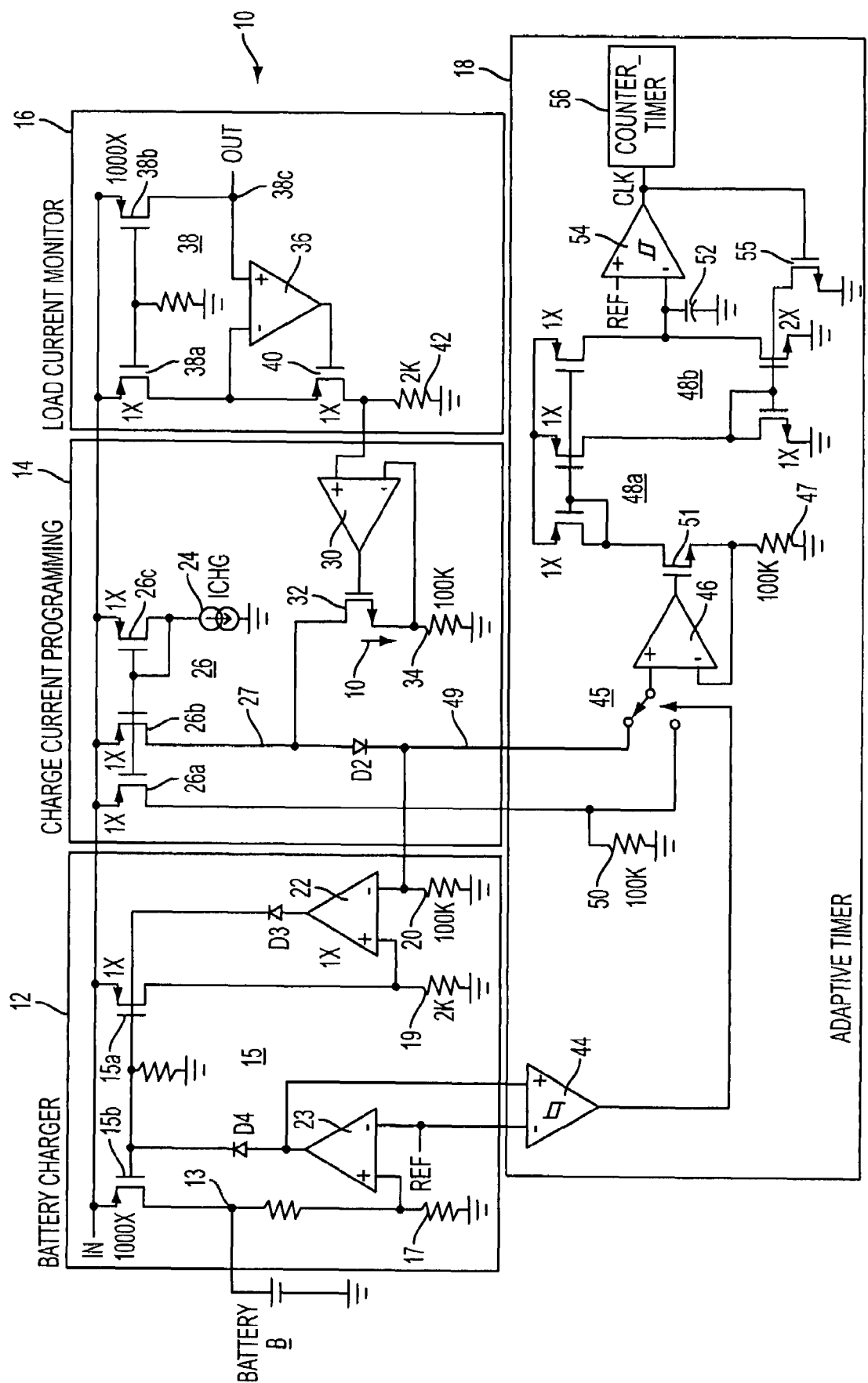
FIG. 3 is a more detailed circuit diagram showing an exemplary implementation of the system.

In FIG. 3, battery charger circuit 12 as represented comprises a transistor pair 15 sized to conduct currents respectively of ratio 1/1000 (for this example). The output (drain) of transistor 15b is coupled to the battery B for charging the battery and to the non-inverting input of amplifier 23. To the inverting input of amplifier 23 is applied a reference voltage REF, corresponding to the fully charged terminal voltage of battery B. A lithium-ion battery has a fully charged terminal voltage of 4.2 volts. Transistor 15b is operative with amplifier 23 through diode D4 so as to maintain a constant voltage at battery B.

The output (drain) of transistor 15a is coupled to the non-inverting input of amplifier 22 and ground through resistor 19. The inverting input of amplifier 22 is connected to ground through resistor 20, and receives from charge current programming circuit 14 a charge current of magnitude equal to program current ICHG minus load current, as determined by circuits 14 and 16 in a manner to be described later.

Load current monitor 16 comprises a transistor pair 38 sized to conduct currents respectively of 1/1000 ratio, with drain of transistor 38a connected to the inverting input of amplifier 36 and to the source of transistor 40, and with drain of transistor 38b connected to the non-inverting input of the amplifier and to the output node OUT. The gate of transistor 40 is controlled by the output of amplifier 36; the drain of the transistor is connected to ground through resistor 42. Transistor 40 is operative with amplifier 36 so as to carry the same current as transistor 38a and maintain equal drain voltages on transistors 38a and 38b.

Load current through transistor 38b is mirrored into transistors 38a and 40 by amplifier 36, so as to produce a voltage on resistor 42 corresponding to load current. This voltage is passed to charge current programming circuit 14 through amplifier 30, controlling conduction of current through transistor 32 so as to sink current from line 27 in an amount corresponding to load current IL.

Within charge current programming circuit 14 is a current mirror 26 consisting of transistors 26a, 26b and 26c interconnected as shown and in circuit with reference current source ICHG. ICHG, provided by mirror transistor 26b to line 27, is branched at the anode of diode D2, such that a current corresponding to load current IL is subtracted from ICHG by transistor 32, as aforementioned, and the remainder (ICHG−IL) is applied to resistor 20. The corresponding voltage is applied to amplifier 22 of battery charger circuit 12. This corresponding voltage is proportional to battery charge current and is applied also to adaptive timer 18 for controlling the timer period for charging battery B during current mode charging.

Current from the USB port, applied at input node of charger 12, is provided as charging current via transistor 15b to battery B, and through transistor 38b to an attached load at output node 38c of load current monitor 16 for operating the application. The time during which charging current is applied to battery B is controlled by adaptive timer 18, coupled to battery charger 12 and charge current programming circuit 14. As aforementioned, battery B may be, but is not limited to being, a lithium-ion battery Power management circuit 10 operates as follows. Battery charger 12 functions alternatively in two modes: current charging mode and voltage charging mode. When battery B is discharged, the charger 12 operating in the current mode supplies to the battery a charging current of magnitude determined by charge current programming circuit 14. When the battery B is nearly fully charged, charger 12 begins operating in voltage mode to supply a smaller magnitude of current to the battery in order to maintain the battery at a constant terminal voltage corresponding to the fully charged state.

The magnitude of charging current supplied to the battery by the charger 12 in current charging mode is programmed by the designer and is dependent on type, size and other characteristics of the battery. When the load consumes no current, the charge current programming circuit 14 supplies the entirety of the programmed charge current to the battery. However, because the amount of input current is limited, battery charging current must be reduced by any current consumed by the load. Hence, load current monitor 16 monitors current consumed by the load, and reduces the programmed charge current by the amount current being taken by the load so as to limit the amount of total current drawn from the current source to the specified amount (e.g., USB port current). Timer 18 is responsive to battery charging current to vary the time period during which the battery is charged dependent upon magnitude of charge current. That is, as charge current magnitude is reduced (due to increased load current), the time period set by timer 18 is correspondingly increased.

Adaptive timer 18 comprises a counter 56 that is clocked by the output of a hysteretic comparator 54, triggered by the magnitude of voltage on a capacitor relative to REF. Capacitor 52 is driven by upper and lower current mirrors 48a and 48b in turn controlled through buffer 46 alternatively by voltage on line 49 corresponding to magnitude of battery charging current, i.e., difference between program and load currents (in constant current charging mode), or by hysteretic comparator 44 to a programmed fixed time period (in constant voltage mode charging).

Circuit operation of power management system 10 is as follows. At low battery voltage, amplifier 23 is out of regulation because the magnitude of voltage applied to the non-inverting input of the amplifier is less than the magnitude of the reference voltage applied to the non-inverting input, and the output of the amplifier is low (ground). The output of amplifier 23 is now isolated from current mirror 15 by diode D4, allowing amplifier 22 to regulate current into resistor 19 through transistor 15a, so as to match the voltage presented to resistor 20 by charge current programming circuit 14. As described, the programming current applied to resistor 20 assumes a magnitude equal to the difference between programming current source 24 and the load current. Accordingly, the battery B is charged by charger 12 with a current equal to the programming charge current minus instantaneous load current.

The time period during which the battery is being charged during current mode charging is controlled at this time by adaptive timer 18. Timer 18 includes a switch 45 having an upper pole corresponding to constant current charging mode, and a lower pole corresponding to constant voltage charging mode. Switch 45 is depicted symbolically as a mechanical switch; in practice it is electronic.

During current mode charging, with the switch in the upper position, as shown, amplifier 46 receives an input voltage corresponding to battery charging current (difference between programming current and load current), whose output is applied to current mirror circuit. The output of current mirror 48 is applied to a capacitor 52 and the inverting input of an hysteretic comparator 54, the non-inverting input of which is connected to the source of reference voltage REF.

When switch 45 is in the (upper) current charging position, as depicted, buffer amplifier 46 drives transistor 51 such that the current in resistor 47 is driven to be equal to the current in resistor 20. The current in resistor 47 is mirrored by top side and bottom side current mirrors 48a and 48b, referenced, respectively to capacitor 52 and to ground.

Assuming initially that capacitor 52 voltage is zero, the clock output CLK from comparator 54 is high, which enables transistor 55 and shuts down bottom side current mirror 48b. Top side current mirror 48a correspondingly supplies its current to capacitor 52, and ramps the capacitor voltage up until the upper threshold REF of comparator is attained. The output of this comparator now switches to its low state, disabling transistor 55 which enables the bottom side mirror 48b. Because the mirror ratio is 2:1 from bottom to top, the mirror will sink all the current from the top side mirror plus one additional unit of current from the capacitor 52, which now discharges. This cycle repeats at a frequency dependent upon the magnitude of battery charge current. The frequency of the counter accordingly is proportional to the current into the capacitor which in turn is proportional to the battery charge current in the constant current mode.

The charger thereafter enters voltage mode where it is no longer desirable to have the oscillator frequency track the battery charge current. Voltage mode is detected by monitoring the output of battery charger amplifier 23, implementing a hysteretic comparator 44 that compares the output of amplifier 23 with the reference voltage REF. When the output of amplifier 23 begins to increase, indicating that the battery is near fully charged, and reaches the reference voltage REF corresponding to voltage mode, comparator 44 is activated, driving switch 46 to its voltage mode position (lower position), and controls timing based on only the constant current source 24, rather than on variable battery current during current mode charging—measured as the difference between the constant current source current and load current. The timer 56 operates to control the remaining period of charging by battery charger 12 in a conventional manner.

Having described embodiments, it is noted that modifications and variations can be made by persons skilled in the art in light of the above teachings. It is therefore to be understood that changes may be made in the particular embodiments disclosed that are within the scope and sprit of the disclosure as defined by the appended claims and equivalents. For example, the battery current may be reduced in order to reduce circuit heating, rather than reduced in response to voltage mode charging, and in that event the timing period of the timer may be varied in order to ensure that the battery becomes fully charged. As another example, a current monitor can be positioned to monitor discharge of the battery, to run the timer oscillator in a mode that would decrement the counter rather than increment the counter as is done during charge mode. Furthermore, although the system is described herein within the context of a USB powered battery charger, intended for charging a single cell lithium-ion battery or a single cell of a multi-cell lithium-ion battery system, the principles taught by this disclosure are not limited in this respect.

What is claimed is:

1. For a battery powered application, a power management method for providing power to both a load and a battery, comprising steps of:
    generating a battery-charging control current with a magnitude variable in accordance with an input current and a load current;
    supplying a charging current to the battery for a charging period determined by a timer duration to charge the battery from a discharged state to a charged state, the charging current being controlled in accordance with the magnitude of the battery-charging control current;
    generating a clock signal with a frequency variable in accordance with the magnitude of the battery-charging control current; and
    counting the timer duration based on the clock signal, wherein
    the timer duration is variable in accordance with the frequency of the clock signal being variable in accordance with the magnitude of the battery-charging control current,
    wherein the step of generating the clock signal includes charging and discharging a capacitor with a capacitor-charging current having a magnitude variable in accordance with the magnitude of battery-charging control current,
    wherein the frequency of the clock signal is determined in accordance with a frequency of the charge and discharge of the capacitor.

2. A method in accordance with claim 1, wherein the timer duration is varied inversely to the magnitude of the battery-charging control current.

3. A method in accordance with claim 1, including a step of detecting when a battery charging mode is selected to be voltage mode charging, and in response, setting the charging period to a prescribed charging period.

4. A method in accordance with claim 3, in which the prescribed charging period is dependent on battery type.

5. A method in accordance with claim 1, wherein the magnitude of the battery-charging control current is determined in accordance with battery type.

6. A method in accordance with claim 1, in which the input current is obtained from a USB port.

7. A power management system for a battery powered application, the system providing power to a load and a battery, comprising:
    charge current programming circuitry configured for generating a battery-charging control current with a magnitude variable in accordance with an input current and a load current;
    battery charging circuitry configured for supplying a charging current to the battery for a charging period determined by a timer duration to charge the battery from a discharged state to a charged state, the charging current being controlled in accordance with the magnitude of the battery-charging control current; and
    timer circuitry configured for generating a clock signal with a frequency variable in accordance with the magnitude of the battery-charging control current, and counting the timer duration based on the clock signal, wherein the timer duration is variable in accordance with the frequency of the clock signal being variable in accordance with the magnitude of the battery-charging control current, wherein the timer circuitry is configured for generating a capacitor-charging current to charge and discharge a capacitor so as to generate the clock signal, the magnitude of the capacitor-charging current is determined in accordance with the magnitude of battery-charging control current, and the frequency of the clock signal is determined in accordance with a frequency of the charge and discharge of the capacitor.

8. A power management system in accordance with claim 7, wherein the timer circuitry is configured for varying the timer duration inversely to current magnitude.

9. A power management system in accordance with claim 7, wherein the timer circuitry is configured for detecting when a battery charging mode is selected to be voltage mode charging, and in response, setting the charging period to a prescribed charging period.

10. A power management system in accordance with claim 9, in which the prescribed charging period is dependent on battery type.

11. A power management system in accordance with claim 7, the magnitude of the battery-charging control current is determined in accordance with battery type.

12. A power management system in accordance with claim 1, in which the input current is obtained from a USB port.

* * * * *